US011273373B2

(12) United States Patent
Cotter

(10) Patent No.: US 11,273,373 B2
(45) Date of Patent: *Mar. 15, 2022

(54) SYSTEM AND METHOD FOR COMBINING MULTIPLE GAME OR APPLICATION VIEWS INTO A SINGLE MEDIA STREAM

(71) Applicant: Sony Interactive Entertainment LLC, San Mateo, CA (US)

(72) Inventor: Timothy Cotter, Sunnyvale, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,953

(22) Filed: Jul. 10, 2017

(65) Prior Publication Data

US 2017/0304724 A1   Oct. 26, 2017

Related U.S. Application Data

(63) Continuation of application No. 13/797,271, filed on Mar. 12, 2013, now Pat. No. 9,700,789.

(51) Int. Cl.
| | |
|---|---|
| *A63F 13/33* | (2014.01) |
| *A63F 13/355* | (2014.01) |
| *A63F 13/86* | (2014.01) |
| *A63F 13/87* | (2014.01) |
| *H04N 21/2365* | (2011.01) |
| *A63F 13/795* | (2014.01) |

(52) U.S. Cl.
CPC ............ *A63F 13/355* (2014.09); *A63F 13/86* (2014.09); *A63F 13/87* (2014.09); *A63F 13/795* (2014.09); *H04N 21/2365* (2013.01)

(58) Field of Classification Search
CPC .......... H04N 7/26; H04N 7/173; A63F 13/12; A63F 13/23; A63F 13/25; A63F 13/30; A63F 13/32; A63F 13/327; A63F 13/33; A63F 13/332; A63F 13/335; A63F 13/355; A63F 13/358; A63F 2300/30; A63F 13/401; A63F 13/532; A63F 13/534
USPC ......................................................... 463/31
See application file for complete search history.

(56) References Cited

U.S. PATENT DOCUMENTS

| | | | |
|---|---|---|---|
| 2007/0024705 A1* | 2/2007 | Richter | .............. H04N 7/17318 348/142 |
| 2007/0024706 A1* | 2/2007 | Brannon | ............. H04N 7/17318 348/142 |

(Continued)

*Primary Examiner* — Omkar A Deodhar
(74) *Attorney, Agent, or Firm* — Penilla IP, APC

(57) ABSTRACT

A system and method are described for combining multiple views of a video game or application into a single video stream (or set of video streams). For example, a system according to one embodiment comprises: a plurality of application/video game instances executed for a particular multi-player video game or application on a hosting service, the application/video game instances being executed in response to control signals received from a plurality of clients; compositing logic executed at the hosting service to combine video streams generated by each of the application/video game instances into a single video stream for a first one of the clients; and compression logic to compress the single video stream with low latency such that the user of the first one of the clients has the perception that the video game or application is being executed locally.

19 Claims, 11 Drawing Sheets

(56) References Cited

U.S. PATENT DOCUMENTS

| | | | | |
|---|---|---|---|---|
| 2009/0118017 | A1* | 5/2009 | Perlman | H04N 21/2143 |
| | | | | 463/42 |
| 2010/0166062 | A1* | 7/2010 | Perlman | A63F 13/12 |
| | | | | 375/240.05 |
| 2010/0166063 | A1* | 7/2010 | Perlman | H04N 21/2343 |
| | | | | 375/240.07 |
| 2011/0107220 | A1* | 5/2011 | Perlman | A63F 13/12 |
| | | | | 715/720 |
| 2011/0126255 | A1* | 5/2011 | Perlman | H04N 7/24 |
| | | | | 725/116 |
| 2013/0123019 | A1* | 5/2013 | Sullivan | A63F 13/86 |
| | | | | 463/42 |
| 2014/0071151 | A1* | 3/2014 | Oesterreicher | G06T 11/40 |
| | | | | 345/589 |
| 2014/0195594 | A1* | 7/2014 | Ahuja | G06F 3/0484 |
| | | | | 709/203 |
| 2014/0297799 | A1* | 10/2014 | Gordon | H04L 67/38 |
| | | | | 709/217 |
| 2014/0349750 | A1* | 11/2014 | Thompson | A63F 13/12 |
| | | | | 463/31 |
| 2015/0100995 | A1* | 4/2015 | Perlman | H04N 7/17318 |
| | | | | 725/96 |

\* cited by examiner

SYSTEM AND METHOD FOR COMBINING MULTIPLE GAME OR APPLICATION VIEWS INTO A SINGLE MEDIA STREAM

CLAIM OF PRIORITY

This application is a Continuation of co-pending U.S. application Ser. No. 13/797,271, filed on Mar. 12, 2013, entitled, "System and Method for Combining Multiple Game or Application Views Into a Single Media Stream", which is incorporated herein by reference.

TECHNICAL FIELD

The present disclosure relates generally to the field of data processing systems and particularly to a system and method for combining multiple game or application views into a single media stream.

BACKGROUND

Some current networked multi-player video games support audio communication between game participants. For example, the well known "Battlefield" franchise of first person shooter games allow participants to join a team with one or more other players and to communicate with the other members of the team using voice chat.

The video game program code used for multiplayer games is executed on each individual user's computer and audio communication channels are established between computers to enable voice chat. In this configuration, each user's voice is packetized at the client computer on which the user is playing the game and broadcast to all of the other players on the user's team. In some implementations, the voice is transmitted to a server which then redistributes the audio to each of the players.

However, current multi-player games provide limited control over the users to be included in verbal communication sessions. For example, inter-player communication is typically limited to team members and is not configurable on a player-by-player basis. Consequently, what is needed is a video gaming platform which provides for more configurable audio chat options. For example, it would be beneficial to allow users to open multiple audio chat communication channels with different categories of other players as well as non-players (e.g., spectators) of online video games.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a system and method for managing audio channels such as voice chat channels for computer games.

An Exemplary Online Video Game and Application Hosting System

Figure 1:
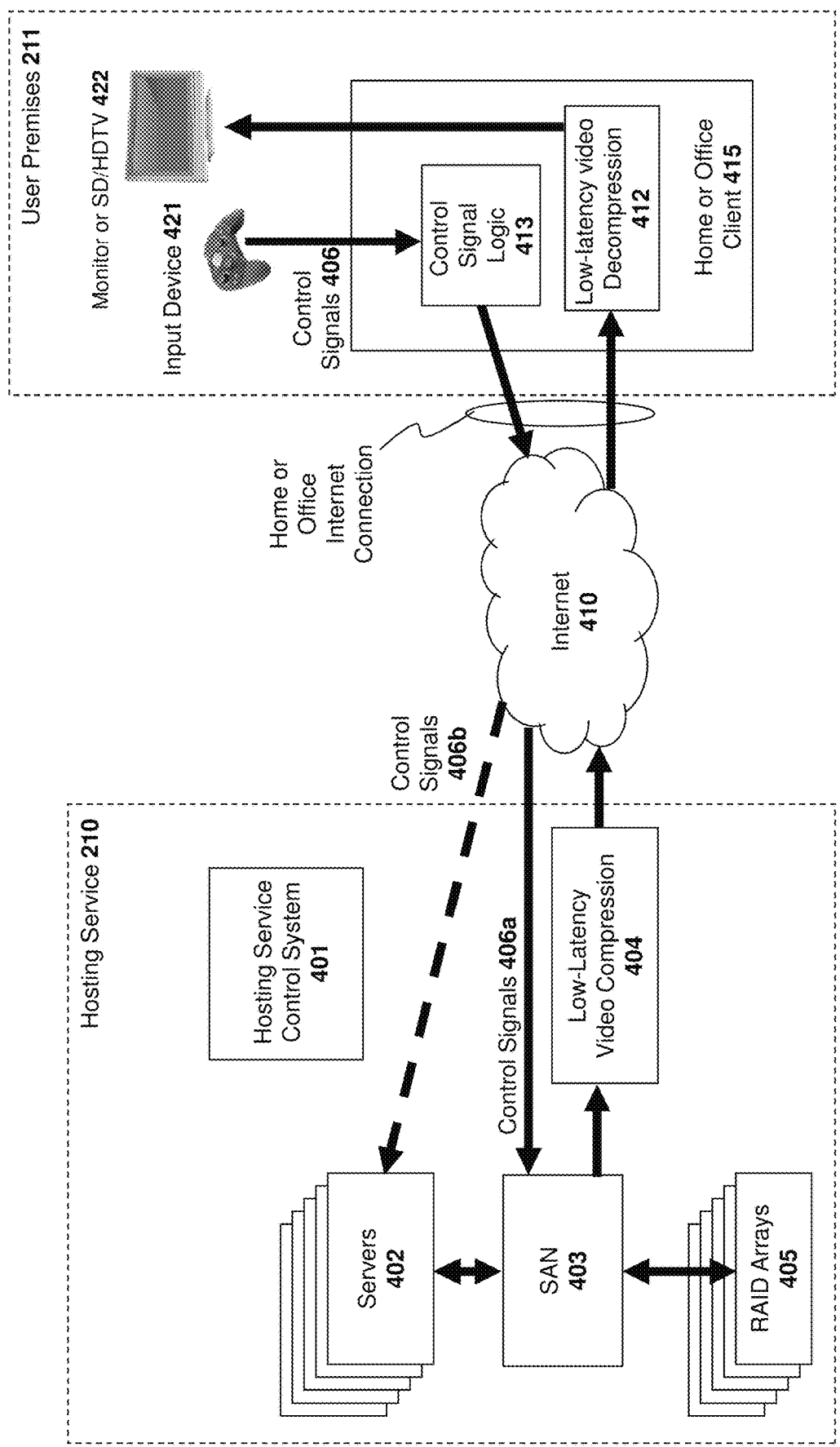
FIG. 1 illustrates a system architecture for executing online video games according to one embodiment of the invention.

FIG. 1 illustrates one embodiment of a video game/application Hosting Service 210 described in the co-pending applications. The Hosting Service 210 hosts applications running on Servers 402, that accept input from an Input device 421, received by Home or Office Client 415, and sent through the Internet 410 to Hosting Service 210. The Servers 402 are responsive to the input, and update their video and audio output accordingly which is compressed through Low-Latency Video Compression 404. The compressed video is then streamed through the Internet 410 to be decompressed by the Home or Office Client 415, and then displayed on Monitor or SD/HDTV 422. This system is a low-latency streaming interactive video system as more thoroughly described in the aforementioned "co-pending applications."

Figure 2:
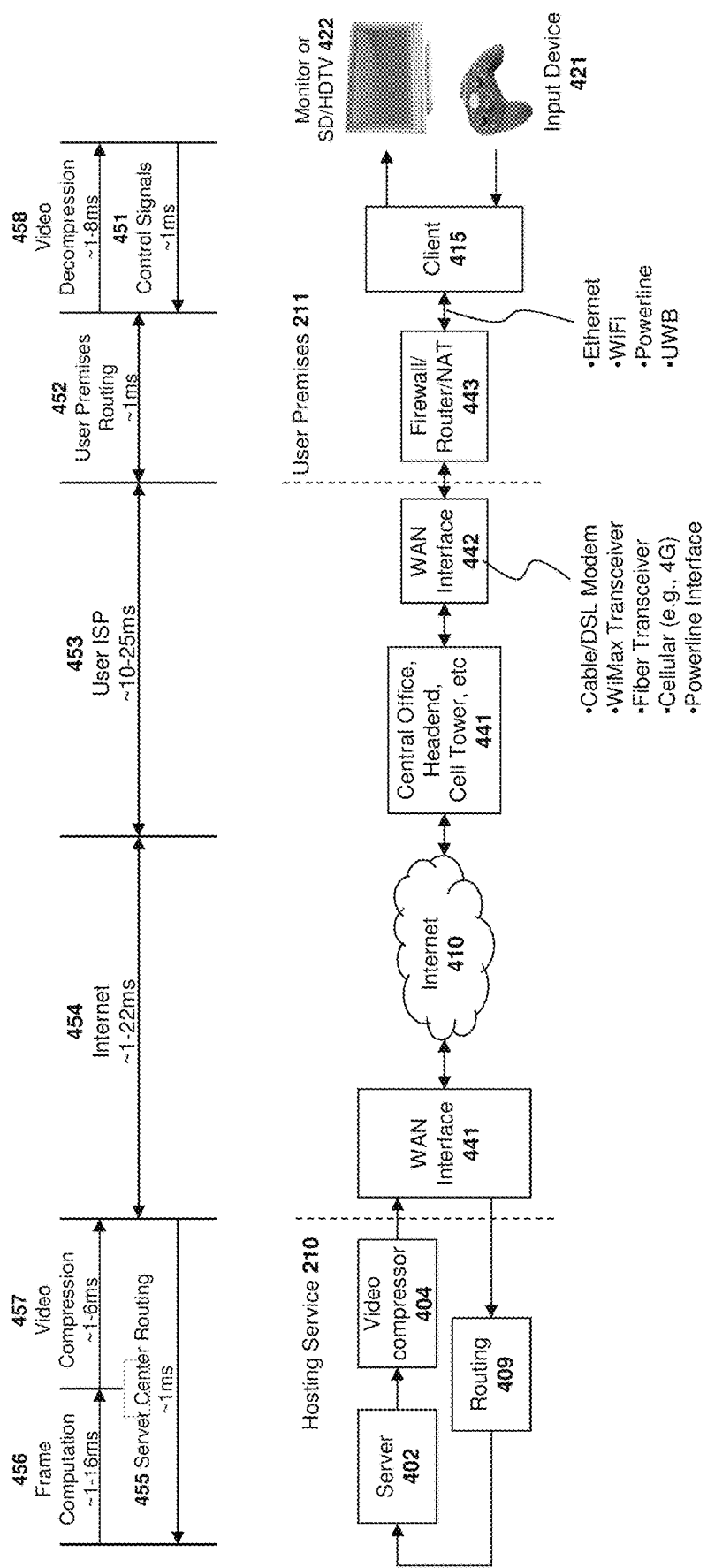
FIG. 2 illustrates different communication channels over which an online video game may be played in accordance with one embodiment of the invention.

As shown in FIG. 2, the network connection between the Hosting Service 210 Home and Office Client 415 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial sensors, position sensors, wands, video capture cameras and/or motion-tracking cameras, etc.), or they may use external input devices 421 (e.g., keyboards, mice, game controllers, inertial sensors, position sensor, wands, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 415 receives control signals 406 from input device 421 from the user, and then it transmits the controller input through the Internet 410 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 410. The home or office client device then decodes the compressed video stream and renders the decompressed video images on a monitor or TV.

Consequently, the computing and graphical hardware requirements of the client device 415 are significantly reduced. The client 415 only needs to have the processing power to forward the input device 421 control signals 406 through the Internet 410 and decode and decompress a compressed video stream received from the Internet 410, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 415 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 415 since its processing requirements will remain constant for a display resolution and frame rate with a given video decompression algorithm. Thus, the hardware limitations and compatibility issues seen today do not exist in the system illustrated in FIG. 1.

Further, because the game and application software executes only in servers in the hosting service 210, there never is a copy of the game or application software (either in the form of physical optical media such as a DVD-ROM, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Different business models are possible under this architecture. Under one model, the hosting service 210 collects a subscription fee from the end user and pays a royalty to the developers. In an alternate implementation, the developers collect a subscription fee directly from the user and pays the hosting service 210 for hosting the game or application content. These underlying principles are not limited to any particular business model for providing online gaming or application hosting.

Figure 3:
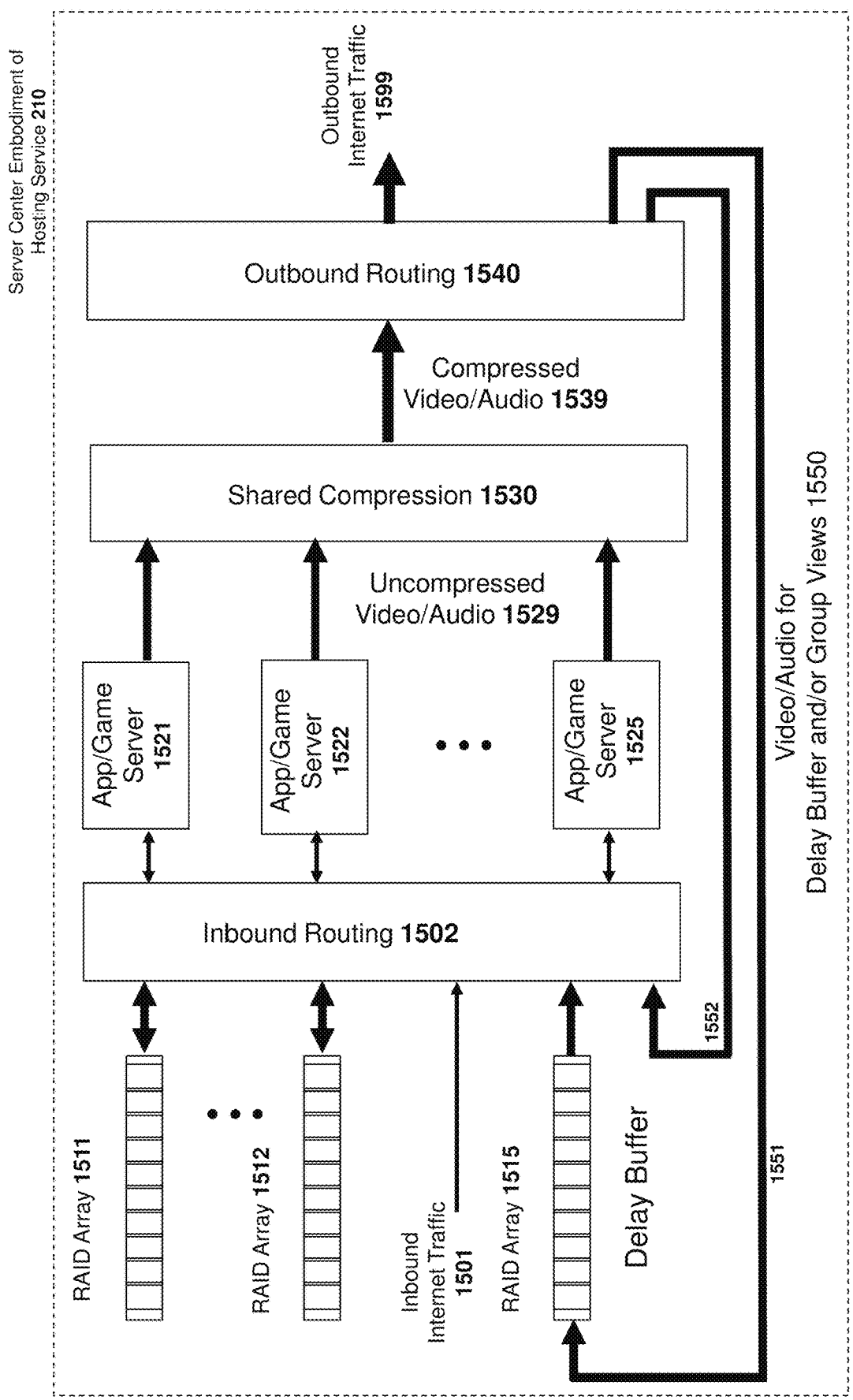
FIG. 3 illustrates one embodiment of a system architecture for compressing audio/video generated by a video game.

FIG. 3 illustrates an embodiment of components of a server center for hosting service 210 utilized in the following feature descriptions. Inbound internet traffic 1501 from user clients 415 is directed to inbound routing 1502. Typically, inbound internet traffic 1501 will enter the server center via a high-speed fiber optic connection to the Internet, but any network connection means of adequate bandwidth, reliability and low latency will suffice. Inbound routing 1502 is a system of network (the network can be implemented as an Ethernet network, a fiber channel network, or through any other transport means) switches and routing servers supporting the switches which takes the arriving packets and routes each packet to the appropriate application/game ("app/game") server 1521-1525. In one embodiment, a packet which is delivered to a particular app/game server represents a subset of the data received from the client and/or may be translated/changed by other components (e.g., networking components such as gateways and routers) within the data center. In some cases, packets will be routed to more than one server 1521-1525 at a time, for example, if a game or application is running on multiple servers at once in parallel. RAID arrays 1511-1512 are connected to the inbound routing network 1502, such that the app/game servers 1521-1525 can read and write to the RAID arrays 1511-1512. Further, a RAID array 1515 (which may be implemented as multiple RAID arrays) is also connected to the inbound routing 1502 and data from RAID array 1515 can be read from app/game servers 1521-1525. The inbound routing 1502 may be implemented in a wide range of prior art network architectures, including a tree structure of switches, with the inbound internet traffic 1501 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 1521-1525 may each have multiple network connections to the inbound routing 1502. For example, a server 1521-1525 may have a network connection to a subnet attached to RAID Arrays 1511-1512 and another network connection to a subnet attached to other devices.

The app/game servers 1521-1525 may all be configured the same, some differently, or all differently, as previously described in relation to servers 402 in the embodiment illustrated in FIG. 1. In one embodiment, each user, when using the hosting service is typically using at least one app/game server 1521-1525. For the sake of simplicity of explanation, we shall assume a given user is using app/game server 1521, but multiple servers could be used by one user, and multiple users could share a single app/game server 1521-1525. The user's control input, sent from client 415 as previously described is received as inbound Internet traffic 1501, and is routed through inbound routing 1502 to app/game server 1521. App/game server 1521 uses the user's control input as control input to the game or application running on the server, and computes the next frame of video and the audio associated with it. App/game server 1521 then outputs the uncompressed video/audio 1529 to shared video compression 1530. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 1530 compresses the uncompressed video and audio from the app/game servers 1521-1525. The compression may be implemented entirely in hardware, or in hardware running software. There may a dedicated compressor for each app/game server 1521-1525, or if the compressors are fast enough, a given compressor can be used to compress the video/audio from more than one app/game server 1521-1525. For example, at 60 fps a video frame time is 16.67 ms. If a compressor is able to compress a frame in 1 ms, then that compressor could be used to compress the video/audio from as many as 16 app/game servers 1521-1525 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 1530 with shared storage means (e.g., RAM, Flash) for storing the state of each compression process, and when a server 1521-1525 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 1521-1525 supporting each user monitoring data sent from the client 415, the app/game server 1521-1525 sends the relevant information to the shared hardware compression 1530.

The shared hardware compression 1530 also packetizes the compressed video/audio using means such as those previously described, and if appropriate, applying FEC codes, duplicating certain data, or taking other steps to as to adequately ensure the ability of the video/audio data stream to be received by the client 415 and decompressed with as high a quality and reliability as feasible.

Some applications, such as those described below, require the video/audio output of a given app/game server 1521-1525 to be available at multiple resolutions (or in other multiple formats) simultaneously. If the app/game server 1521-1525 so notifies the shared hardware compression 1530 resource, then the uncompressed video audio 1529 of that app/game server 1521-1525 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 1539 of all of the various resolutions and formats required for a given app/game server 1521-1525 (be it one or many) will be output at once to outbound routing 1540. In one embodiment the output of the compressed video/audio 1539 is in UDP format, so it is a unidirectional stream of packets.

The outbound routing network 1540 comprises a series of routing servers and switches which direct each compressed video/audio stream to the intended user(s) or other destinations through outbound Internet traffic 1599 interface (which typically would connect to a fiber interface to the Internet) and/or back to the delay buffer 1515, and/or back to the inbound routing 1502, and/or out through a private network (not shown) for video distribution. Note that (as described below) the outbound routing 1540 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 1540. The multiple destinations of the broadcast may be to multiple users' clients 415 via the Internet, to multiple app/game servers 1521-1525 via inbound routing 1502, and/or to one or more delay buffers 1515. Thus, the output of a given server 1521-1522 is compressed into one or multiple formats, and each compressed stream is directed to one or multiple destinations.

Further, in another embodiment, if multiple app/game servers 1521-1525 are used simultaneously by one user (e.g., in a parallel processing configuration to create the 3D output of a complex scene) and each server is producing part of the resulting image, the video output of multiple servers 1521-1525 can be combined by the shared hardware compression 1530 into a combined frame, and from that point forward it is handled as described above as if it came from a single app/game server 1521-1525.

Note that in one embodiment, a copy (in at least the resolution or higher of video viewed by the user) of all video generated by app/game servers 1521-1525 is recorded in delay buffer 1515 for at least some number of minutes (15 minutes in one embodiment). This allows each user to "rewind" the video from each session in order to review previous work or exploits (in the case of a game). Thus, in one embodiment, each compressed video/audio output 1539 stream being routed to a user client 415 is also being multicasted to a delay buffer 1515. When the video/audio is stored on a delay buffer 1515, a directory on the delay buffer 1515 provides a cross reference between the network address of the app/game server 1521-1525 that is the source of the delayed video/audio and the location on the delay buffer 1515 where the delayed video/audio can be found.

Figure 4:
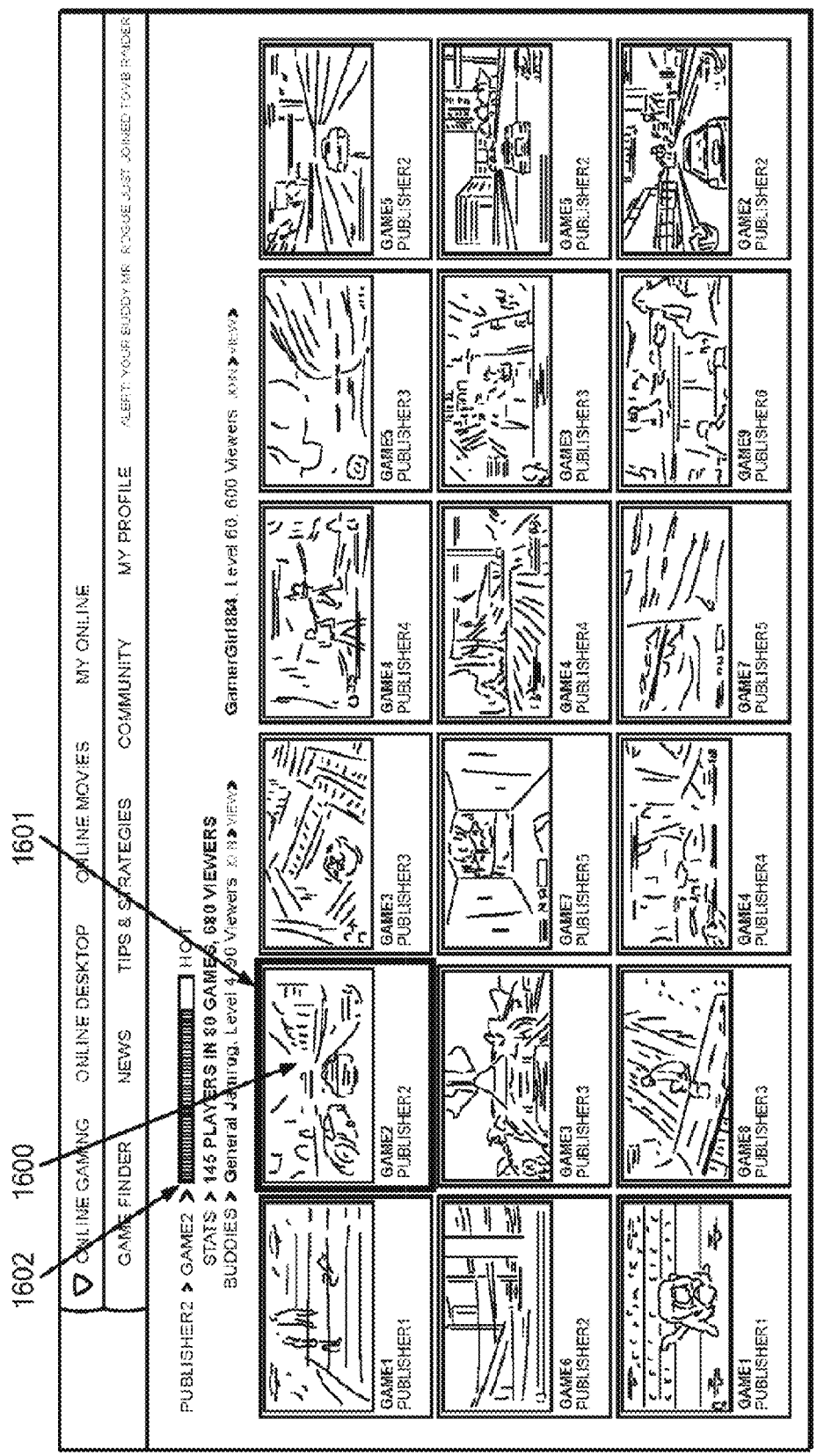
FIGS. 4-8 illustrate embodiments of a graphical user interface (GUI) for navigating a video game hosting service and viewing online video games.

App/game servers 1521-1525 may not only be used for running a given application or video game for a user, but they may also be used for creating the user interface applications for the hosting service 210 that supports navigation through hosting service 210 and other features. A screen shot of one such user interface application is shown in FIG. 4, a "Game Finder" screen. This particular user interface screen allows a user to watch 15 games that are being played live (or delayed) by other users.

Each of the "thumbnail" video windows, such as 1600 is a live video window in motion showing the video from one user's game. The view shown in the thumbnail may be the same view that the user is seeing, or it may be a delayed view (e.g., if a user is playing a combat game, a user may not want other users to see where she is hiding and she may choose to delay any view of her gameplay by a period of time, say 10 minutes). The view may also be a camera view of a game that is different from any user's view. Through menu selections (not shown in this illustration), a user may choose a selection of games to view at once, based on a variety of criteria. As a small sampling of exemplary choices, the user may select a random selection of games (such as those shown in FIG. 16), all of one kind of games (all being played by different players), only the top-ranked players of a game, players at a given level in the game, or lower-ranked players (e.g., if the player is learning the basics), players who are "buddies" (or are rivals), games that have the most number of viewers, etc.

Note that generally, each user will decide whether the video from his or her game or application can be viewed by others and, if so, which others, and when it may be viewed by others, whether it is only viewable with a delay.

The app/game server 1521-1525 that is generating the user interface screen shown in FIG. 4 acquires the 15 video/audio feeds by sending a message to the app/game server 1521-1525 for each user whose game it is requesting from. The message is sent through the inbound routing 1502 or another network. The message will include the size and format of the video/audio requested, and will identify the user viewing the user interface screen. A given user may choose to select "privacy" mode and not permit any other users to view video/audio of his game (either from his point of view or from another point of view), or as described in the previous paragraph, a user may choose to allow viewing of video/audio from her game, but delay the video/audio viewed. A user app/game server 1521-1525 receiving and accepting a request to allow its video/audio to be viewed will acknowledge as such to the requesting server, and it will also notify the shared hardware compression 1530 of the need to generate an additional compressed video stream in the requested format or screen size (assuming the format and screen size is different than one already being generated), and it will also indicate the destination for the compressed video (i.e., the requesting server). If the requested video/audio is only delayed, then the requesting app/game server 1521-1525 will be so notified, and it will acquire the delayed video/audio from a delay buffer 1515 by looking up the video/audio's location in the directory on the delay buffer 1515 and the network address of the app/game server 1521-1525 that is the source of the delayed video/audio. Once all of these requests have been generated and handled, up to 15 live thumbnail-sized video streams will be routed from the outbound routing 1540 to the inbound routing 1502 to the app/game server 1521-1525 generating the user interface screen, and will be decompressed and displayed by the server. Delayed video/audio streams may be in too large a screen size, and if so, the app/game server 1521-1525 will decompress the streams and scale down the video streams to thumbnail size. In one embodiment, requests for audio/video are sent to (and managed by) a central "management" service similar to the hosting service control system of FIG. 1 which then redirects the requests to the appropriate app/game server 1521-1525. Moreover, in one embodiment, no request may be required because the thumbnails are "pushed" to the clients of those users that allow it.

The audio from 15 games all mixed simultaneously might create a cacophony of sound. The user may choose to mix all of the sounds together in this way (perhaps just to get a sense of the "din" created by all the action being viewed), or the user may choose to just listen to the audio from one game at a time. The selection of a single game is accomplished by moving the yellow selection box 1601 (appearing as a black rectangular outline in the black-and-white rendering of FIG. 4) to a given game (the yellow box movement can be accomplished by using arrow keys on a keyboard, by moving a mouse, by moving a joystick, or by pushing directional buttons on another device such as a mobile phone). Once a single game is selected, just the audio from that game plays. Also, game information 1602 is shown. In the case of this game, for example, the publisher logo (e.g., "EA" for "Electronic Arts") and the game logo, e.g., "Need for Speed Carbon" and an orange horizontal bar (rendered in FIG. 4 as a bar with vertical stripes) indicates in relative terms the number of people playing or viewing the game at that particular moment (many, in this case, so the game is "Hot"). Further "Stats" (i.e. statistics) are provided, indicating that there are 145 players actively playing 80 different instantiations of the Need for Speed Game (i.e., it can be played either by an individual player game or multiplayer game), and there are 680 viewers (of which this user is one). Note that these statistics (and other statistics) are collected by hosting service control system 401 and are stored on RAID arrays 1511-1512, for keeping logs of the hosting service 210 operation and for appropriately billing users and paying publishers who provide content. Some of the statistics are recorded due to actions by the service control system 401, and some are reported to the service control system 401 by the individual app/game server 1521-1525. For example, the app/game server 1521-1525 running this Game Finder application sends messages to the hosting service control system 401 when games are being viewed (and when they are ceased to be viewed) so that it may update the statistics of how many games are in view. Some of the statistics are available for user interface applications such as this Game Finder application.

Figure 5:
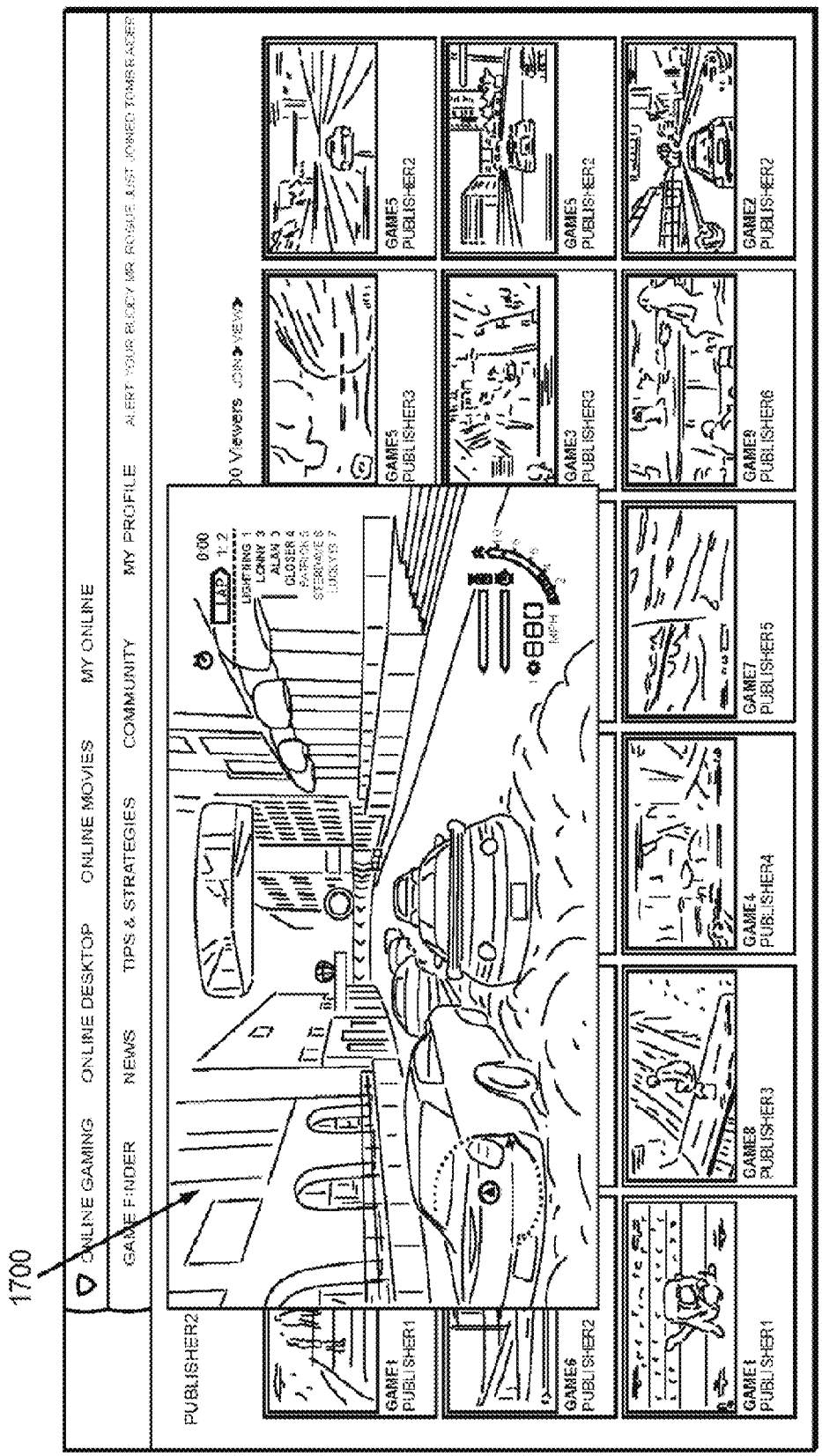

If the user clicks an activation button on their input device, they will see the thumbnail video in the yellow box zoom up while continuing to play live video to full screen size. This effect is shown in process in FIG. 5. Note that video window 1700 has grown in size. To implement this effect, the app/game server 1521-1525 requests from the app/game server 1521-1525 running the game selected to have a copy of the video stream for a full screen size (at the resolution of the user's display device 422) of the game routed to it. The app/game server 1521-1525 running the game notifies the shared hardware compressor 1530 that a thumbnail-sized copy of the game is no longer needed (unless another app/game server 1521-1525 requires such a thumbnail), and then it directs it to send a full-screen size copy of the video to the app/game server 1521-1525 zooming the video. The user playing the game may or may not have a display device 422 that is the same resolution as that of the user zooming up the game. Further, other viewers of the game may or may not have display devices 422 that are the same resolution as the user zooming up the game (and may have different audio playback means, e.g., stereo or surround sound). Thus, the shared hardware compressor 1530 determines whether a suitable compressed video/audio stream is already being generated that meets the requirements of the user requesting the video/audio stream and if one does exist, it notifies the outbound routing 1540 to route a copy of the stream to the app/game server 1521-1525 zooming the video, and if not compresses another copy of the video that is suitable for that user and instructs the outbound routing to send the stream back to the inbound routing 1502 and the app/game server 1521-1525 zooming the video. This server, now receiving a full screen version of the selected video will decompress it and gradually scale it up to full size.

Figure 6:
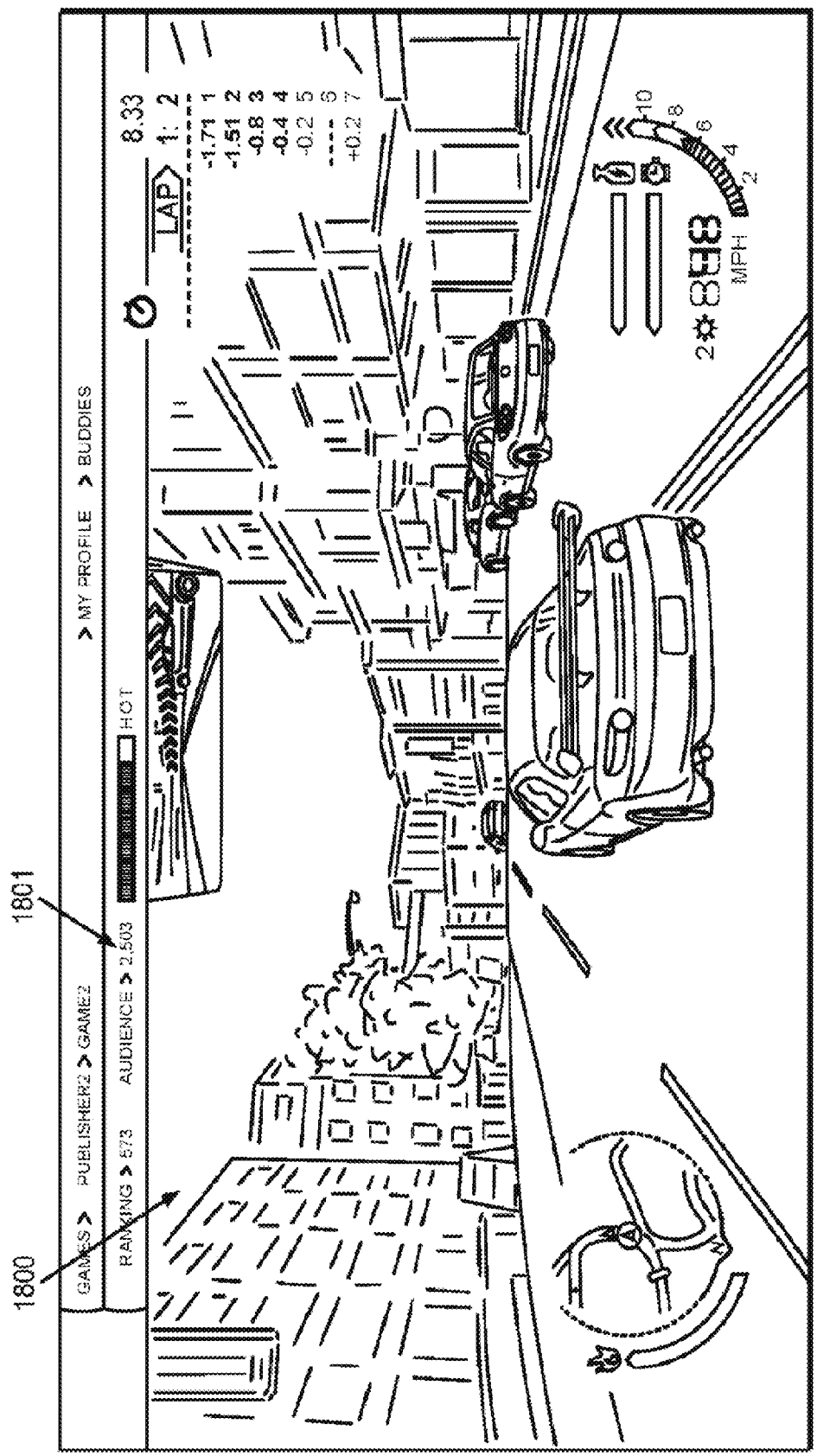

FIG. 6 illustrates how the screen looks after the game has completely zoomed up to full screen and the game is shown at the full resolution of the user's display device 422 as indicated by the image pointed to by arrow 1800. The app/game server 1521-1525 running the game finder application sends messages to the other app/game servers 1521-1525 that had been providing thumbnails that they are no longer needed and messages to the hosting service control server 401 that the other games are no longer being viewed. At this point the only display it is generating is an overlay 1801 at the top of the screen which provides information and menu controls to the user. Note that as this game has progressed, the audience has grown to 2,503 viewers. With so many viewers, there are bound to be many viewers with display devices 422 that have the same or nearly the same resolution (each app/game server 1521-1525 has the ability to scale the video for adjusting the fitting).

Because the game shown is a multiplayer game, the user may decide to join the game at some point. The hosting service 210 may or may not allow the user to join the game for a variety of reasons. For example, the user may have to pay to play the game and choose not to, the user may not have sufficient ranking to join that particular game (e.g., it would not be competitive for the other players), or the user's Internet connection may not have low enough latency to allow the user to play (e.g., there is not a latency constraint for viewing games, so a game that is being played far away (indeed, on another continent) can be viewed without latency concerns, but for a game to be played, the latency must be low enough for the user to (a) enjoy the game, and (b) be on equal footing with the other players who may have lower latency connections). If the user is permitted to play, then app/game server 1521-1525 that had been providing the Game Finder user interface for the user will request that the hosting service control server 401 initiate (i.e., locate and start up) an app/game server 1521-1525 that is suitably configured for playing the particular game to load the game from a RAID array 1511-1512, and then the hosting service control server 401 will instruct the inbound routing 1502 to transfer the control signals from the user to the app/game game server now hosting the game and it will instruct the shared hardware compression 1530 to switch from compressing the video/audio from the app/game server that had been hosting the Game Finder application to compressing the video/audio from the app/game server now hosting the game. The vertical sync of the Game Finder app/game service and the new app/game server hosting the game are not synchronized, and as a result there is likely to be a time difference between the two syncs. Because the shared video compression hardware 1530 will begin compressing video upon an app/game server 1521-1525 completing a video frame, the first frame from the new server may be completed sooner than a full frame time of the old server, which may be before the prior compressed frame completing its transmission (e.g., consider transmit time 992 of FIG. 9b: if uncompressed frame 3 963 were completed half a frame time early, it would impinge upon the transmit time 992). In such a situation the shared video compression hardware 1530 will ignore the first frame from the new server (e.g., like Frame 4 964 is ignored 974), and the client 415 will hold the last frame from the old server an extra frame time, and the shared video compression hardware 1530 will begin compressing the next frame time video from the new app/game server hosting the game. Visually, to the user, the transition from one app/game server to the other will be seamless. The hosting service control server 401 will then notify app/game game server 1521-1525 that had been hosting the Game Finder to switch to an idle state, until it is needed again.

The user then is able to play the game. And, what is exceptional is the game will play perceptually instantly (since it will have loaded onto the app/game game server 1521-1525 from a RAID array 1511-1512 at gigabit/second speed), and the game will be loaded onto a server exactly suited for the game together with an operating system exactly configured for the game with the ideal drivers, registry configuration (in the case of Windows), and with no other applications running on the server that might compete with the game's operation.

Also, as the user progresses through the game, each of the segments of the game will load into the server at gigabit/second speed (i.e., 1 gigabyte loads in 8 seconds) from the RAID array 1511-1512, and because of the vast storage capacity of the RAID array 1511-1512 (since it is a shared resource among many users, it can be very large, yet still be cost effective), geometry setup or other game segment setup can be pre-computed and stored on the RAID array 1511-1512 and loaded extremely rapidly. Moreover, because the hardware configuration and computational capabilities of each app/game server 1521-1525 is known, pixel and vertex shaders can be pre-computed.

Thus, the game will start up almost instantly, it will run in an ideal environment, and subsequent segments will load almost instantly.

But, beyond these advantages, the user will be able to view others playing the game (via the Game Finder, previously described and other means) and both decide if the game is interesting, and if so, learn tips from watching others. And, the user will be able to demo the game instantly, without having to wait for a large download and/or installation, and the user will be able to play the game instantly, perhaps on a trial basis for a smaller fee, or on a longer term basis. And, the user will be able to play the game on a Windows PC, a Macintosh, on a television set, at home, when traveling, and even on a mobile phone, with a low enough latency wireless connection (although latency will not be an issue for just spectating). And, this can all be accomplished without ever physically owning a copy of the game.

As mentioned previously, the user can decide to not allow his gameplay to be viewable by others, to allow his game to be viewable after a delay, to allow his game to be viewable by selected users, or to allow his game to be viewable by all users. Regardless, the video/audio will be stored, in one embodiment, for 15 minutes in a delay buffer 1515, and the user will be able to "rewind" and view his prior game play, and pause, play it back slowly, fast forward, etc., just as he would be able to do had he been watching TV with a Digital Video Recorder (DVR). Although in this example, the user is playing a game, the same "DVR" capability is available if the user is using an application. This can be helpful in reviewing prior work and in other applications as detailed below. Further, if the game was designed with the capability of rewinding based on utilizing game state information, such that the camera view can be changed, etc., then this "3D DVR" capability will also be supported, but it will require the game to be designed to support it. The "DVR" capability using a delay buffer 1515 will work with any game or application, limited of course, to the video that was generated when the game or application was used, but in the case of games with 3D DVR capability, the user can control a "fly through" in 3D of a previously played segment, and have the delay buffer 1515 record the resulting video and have the game state of the game segment recorded. Thus, a particular "fly-through" will be recorded as compressed video, but since the game state will also be recorded, a different fly-through will be possible at a later date of the same segment of the game.

As described below, users on the hosting service 210 will each have a User Page, where they can post information about themselves and other data. Among of the things that users will be able to post are video segments from game play that they have saved. For example, if the user has overcome a particularly difficult challenge in a game, the user can "rewind" to just before the spot where they had their great accomplishment in the game, and then instruct the hosting service 210 to save a video segment of some duration (e.g., 30 seconds) on the user's User Page for other users to watch. To implement this, it is simply a matter of the app/game server 1521-1525 that the user is using to playback the video stored in a delay buffer 1515 to a RAID array 1511-1512 and then index that video segment on the user's User Page.

If the game has the capability of 3D DVR, as described above, then the game state information required for the 3D DVR can also be recorded by the user and made available for the user's User Page.

In the event that a game is designed to have "spectators" (i.e., users that are able to travel through the 3D world and observe the action without participating in it) in addition to active players, then the Game Finder application will enable users to join games as spectators as well as players. From an implementation point of view, there is no difference to the hosting system 210 to if a user is a spectator instead of an active player. The game will be loaded onto an app/game server 1521-1525 and the user will be controlling the game (e.g., controlling a virtual camera that views into the world). The only difference will be the game experience of the user.

Another feature of the hosting service 210 is the ability for multiple users to collaborate while viewing live video, even if using widely disparate devices for viewing. This is useful both when playing games and when using applications.

Many PCs and mobile phones are equipped with video cameras and have the capability to do real-time video compression, particularly when the image is small. Also, small cameras are available that can be attached to a television, and it is not difficult to implement real-time compression either in software or using one of many hardware compression devices to compress the video. Also, many PCs and all mobile phones have microphones, and headsets are available with microphones.

Figure 7:
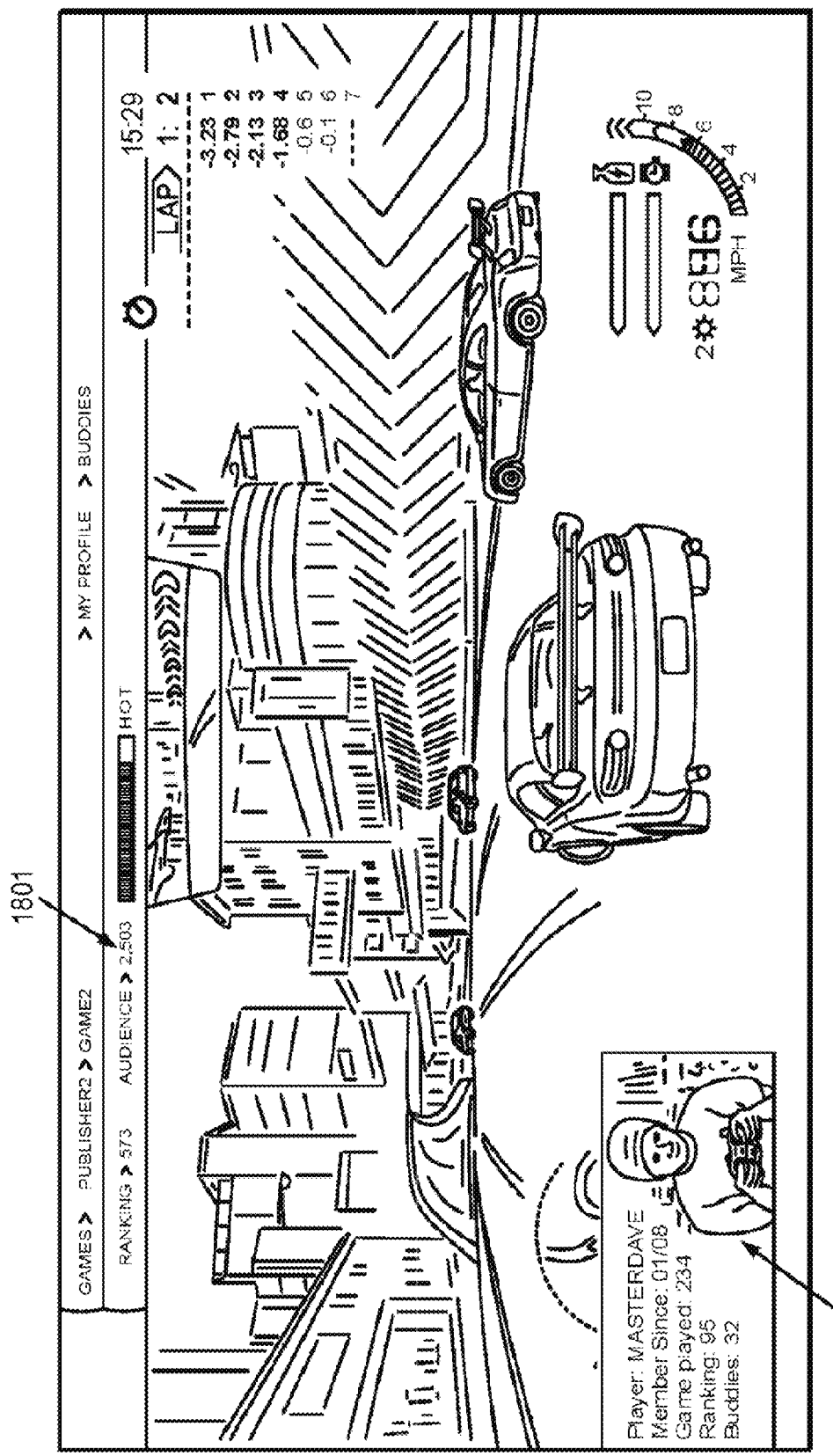

Such cameras and/or microphones, combined with local video/audio compression capability (particularly employing the low latency video compression techniques described herein) will enable a user to transmit video and/or audio from the user premises 211 to the hosting service 210, together with the input device control data. When such techniques are employed, then a capability illustrated in FIG. 7 is achievable: a user can have his video and audio 1900 appear on the screen within another user's game or application. This example is a multiplayer game, where teammates collaborate in a car race. A user's video/audio could be selectively viewable/hearable only by their teammates. And, since there would be effectively no latency, using the techniques described above the players would be able to talk or make motions to each other in real-time without perceptible delay.

This video/audio integration is accomplished by having the compressed video and/or audio from a user's camera/microphone arrive as inbound internet traffic 1501. Then the inbound routing 1502 routes the video and/or audio to the app/game game servers 1521-1525 that are permitted to view/hear the video and/or audio. Then, the users of the respective app/game game servers 1521-1525 that choose to use the video and/or audio decompress it and integrate as desired to appear within the game or application, such as illustrated by 1900.

The example of FIG. 7 shows how such collaboration is used in a game, but such collaboration can be an immensely powerful tool for applications. Consider a situation where a large building is being designed for New York city by architects in Chicago for a real estate developer based in New York, but the decision involves a financial investor who is traveling and happens to be in an airport in Miami, and a decision needs to be made about certain design elements of the building in terms of how it fits in with the buildings near it, to satisfy both the investor and the real estate developer. Assume the architectural firm has a high resolution monitor with a camera attached to a PC in Chicago, the real estate developer has a laptop with a camera in New York, and the investor has a mobile phone with a camera in Miami. The architectural firm can use the hosting service 210 to host a powerful architectural design application that is capable of highly realistic 3D rendering, and it can make use of a large database of the buildings in New York City, as well as a database of the building under design. The architectural design application will execute on one, or if it requires a great deal of computational power on several, of the app/game servers 1521-1525. Each of the 3 users at disparate locations will connect to the hosting service 210, and each will have a simultaneous view of the video output of the architectural design application, but it will be will appropriately sized by the shared hardware compression 1530 for the given device and network connection characteristics that each user has (e.g., the architectural firm may see a 2560×1440 60 fps display through a 20 Mbps commercial Internet connection, the real estate developer in New York may see a 1280×720 60 fps image over a 6 Mbps DSL connection on his laptop, and the investor may see a 320×180 60 fps image over a 250 Kbps cellular data connection on her mobile phone. Each party will hear the voice of the other parties (the conference calling will be handled by any of many widely available conference calling software package in the app/game server(s) 1521-1525) and, through actuation of a button on a user input device, a user will be able to make video appear of themselves using their local camera. As the meeting proceeds, the architects will be able to show what the build looks like as they rotate it and fly by it next to the other building in the area, with extremely photorealistic 3D rendering, and the same video will be visible to all parties, at the resolution of each party's display device. It won't matter that none of the local devices used by any party is incapable of handling the 3D animation with such realism, let alone downloading or even storing the vast database required to render the surrounding buildings in New York City. From the point of view of each of the users, despite the distance apart, and despite the disparate local devices they simply will have a seamless experience with an incredible degree of realism. And, when one party wants their face to be seen to better convey their emotional state, they can do so. Further, if either the real estate developer or the investor want to take control of the architectural program and use their own input device (be it a keyboard, mouse, keypad or touch screen), they can, and it will respond with no perceptual latency (assuming their network connection does not have unreasonable latency). For example, in the case of the mobile phone, if the mobile phone is connected to a WiFi network at the airport, it will have very low latency. But if it is using the cellular data networks available today in the US, it probably will suffer from a noticeable lag. Still, for most of the purposes of the meeting, where the investor is watching the architects control the building fly-by or for talking of video teleconferencing, even cellular latency should be acceptable.

Finally, at the end of the collaborative conference call, the real estate developer and the investor will have made their comments and signed off from the hosting service, the architectural firm will be able to "rewind" the video of the conference that has been recorded on a delay buffer 1515 and review the comments, facial expressions and/or actions applied to the 3D model of the building made during the meeting. If there are particular segments they want to save, those segments of video/audio can be moved from delay buffer 1515 to a RAID array 1511-1512 for archival storage and later playback.

Also, from a cost perspective, if the architects only need to use the computation power and the large database of New York City for a 15 minute conference call, they need only pay for the time that the resources are used, rather than having to own high powered workstations and having to purchase an expensive copy of a large database.

Figure 8:
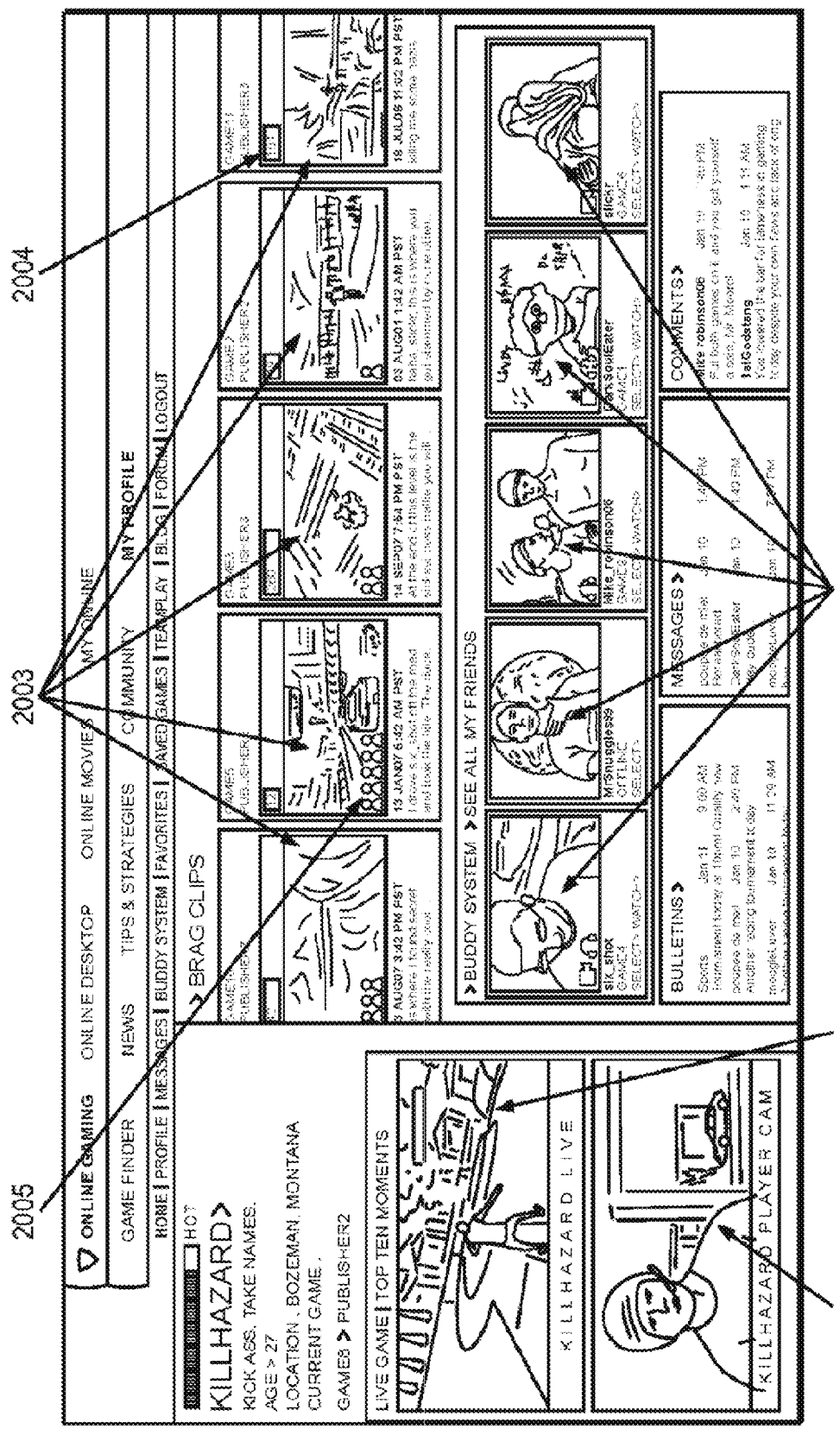

The hosting service 210 enables an unprecedented opportunity for establishing video-rich community services on the Internet. FIG. 8 shows an exemplary User Page for a game player on the hosting service 210. As with the Game Finder application, the User Page is an application that runs on one of the app/game servers 1521-1525. All of the thumbnails and video windows on this page show constantly moving video (if the segments are short, they loop).

Using a video camera or by uploading video, the user (whose username is "KILLHAZARD") is able to post a video of himself 2000 that other users can view. The video is stored on a RAID array 1511-1512. Also, when other users come to KILLHAZARD's User Page, if KILLHAZARD is using the hosting service 210 at the time, live video 2001 of whatever he is doing (assuming he permits users viewing his User Page to watch him) will be shown. This will be accomplished by app/game server 1521-1525 hosting the User Page application requesting from the service control system 401 whether KILLHAZARD is active and if so, the app/game server 1521-1525 he is using. Then, using the same methods used by the Game Finder application, a compressed video stream in a suitable resolution and format will be sent to the app/game server 1521-1525 running the User Page application and it will be displayed. If a user selects the window with KILLHAZARD's live gameplay, and then appropriately clicks on their input device, the window will zoom up (again using the same methods as the Game Finder applications, and the live video will fill the screen, at the resolution of the watching user's display device 422, appropriate for the characteristics of the watching user's Internet connection.

A key advantage of this over prior art approaches is the user viewing the User Page is able to see a game played live that the user does not own, and may very well not have a local computer or game console capable of playing the game. It offers a great opportunity for the user to see the user shown in the User Page "in action" playing games, and it is an opportunity to learn about a game that the viewing user might want to try or get better at.

Camera-recorded or uploaded video clips from KILL-HAZARD's buddies 2002 are also shown on the User Page, and underneath each video clip is text that indicates whether the buddy is online playing a game (e.g., six_shot is playing the game "Eragon" (shown here as Game4) and MrSnuggles99 is Offline, etc.). By clicking on a menu item (not shown) the buddy video clips switch from showing recorded or uploaded videos to live video of what the buddies who are currently playing games on the hosting service 210 are doing at that moment in their games. So, it becomes a Game Finder grouping for buddies. If a buddy's game is selected and the user clicks on it, it will zoom up to full screen, and the user will be able to watch the game played full screen live.

Again, the user viewing the buddy's game does not own a copy of the game, nor the local computing/game console resources to play the game. The game viewing is effectively instantaneous.

As previously described above, when a user plays a game on the hosting service 210, the user is able to "rewind" the game and find a video segment he wants to save, and then saves the video segment to his User Page. These are called "Brag Clips™". The video segments 2003 are all Brag Clips 2003 saved by KILLHAZARD from previous games that he has played. Number 2004 shows how many times a Brag Clip has been viewed, and when the Brag Clip is viewed, users have an opportunity to rate them, and the number of orange (shown here as black outlines) keyhole-shaped icons 2005 indicate how high the rating is. The Brag Clips 2003 loop constantly when a user views the User Page, along with the rest of the video on the page. If the user selects and clicks on one of the Brag Clips 2003, it zooms up to present the Brag Clip 2003, along with DVR controls to allow the clip to be played, paused, rewound, fast-forwarded, stepped through, etc.

The Brag Clip 2003 playback is implemented by the app/game server 1521-1525 loading the compressed video segment stored on a RAID array 1511-1512 when the user recorded the Brag Clip and decompressing it and playing it back.

Brag Clips 2003 can also be "3D DVR" video segments (i.e., a game state sequence from the game that can be replayed and allows the user to change the camera view-point) from games that support such capability. In this case the game state information is stored, in addition to a compressed video recording of the particular "fly through" the user made when the game segment was recorded. When the User Page is being viewed, and all of the thumbnails and video windows are constantly looping, a 3D DVR Brag Clip 2003 will constantly loop the Brag Clip 2003 that was recorded as compressed video when the user recorded the "fly through" of the game segment. But, when a user selects a 3D DVR Brag Clip 2003 and clicks on it, in addition to the DVR controls to allow the compressed video Brag Clip to be played, the user will be able to click on a button that gives them 3D DVR capability for the game segment. They will be able to control a camera "fly through" during the game segment on their own, and, if they wish (and the user who owns the user page so allows it) they will be able to record an alternative Brag Clip "fly through" in compressed video form will then be available to other viewers of the user page (either immediately, or after the owner of the user page has a chance to the review the Brag Clip).

This 3D DVR Brag Clip 2003 capability is enabled by activating the game that is about to replay the recorded game state information on another app/game server 1521-1525. Since the game can be activated almost instantaneously (as previously described) it is not difficult to activate it, with its play limited to the game state recorded by the Brag Clip segment, and then allow the user to do a "fly through" with a camera while recording the compressed video to a delay buffer 1515. Once the user has completed doing the "fly through" the game is deactivated.

From the user's point of view, activating a "fly through" with a 3D DVR Brag Clip 2003 is no more effort than controlling the DVR controls of a linear Brag Clip 2003. They may know nothing about the game or even how to play the game. They are just a virtual camera operator peering into a 3D world during a game segment recorded by another.

Users will also be able to overdub their own audio onto Brag Clips that is either recorded from microphones or uploaded. In this way, Brag Clips can be used to create custom animations, using characters and actions from games. This animation technique is commonly known as "machinima".

As users progress through games, they will achieve differing skill levels. The games played will report the accomplishments to the service control system 401, and these skill levels will be shown on User Pages.

To the extent a game is a multiplayer game, then it will be able communicate both to app/game game servers 1521-1525 through the inbound routing 1502 network and, with a network bridge to the Internet (not shown) with servers or game machines that are not running in the hosting service 210. When playing multiplayer games with computers on the general Internet, then the app/game game servers 1521-1525 will have the benefit of extremely fast access to the Internet (compared to if the game was running on a server at home), but they will be limited by the capabilities of the other computers playing the game on slower connections, and also potentially limited by the fact that the game servers on the Internet were designed to accommodate the least common denominator, which would be home computers on relatively slow consumer Internet connections.

But when a multiplayer game is played entirely within a hosting service 210 server center, then a world of difference is achievable. Each app/game game server 1521-1525 hosting a game for a user will be interconnected with other app/game game servers 1521-1525 as well as any servers that are hosting the central control for the multiplayer game with extremely high speed, extremely low latency connectivity and vast, very fast storage arrays. For example, if Gigabit Ethernet is used for the inbound routing 1502 network, then the app/game game servers 1521-1525 will be communicating among each other and communicating to any servers hosting the central control for the multiplayer game at gigabit/second speed with potentially only 1 ms of latency or less. Further, the RAID arrays 1511-1512 will be able to respond very rapidly and then transfer data at gigabit/second speeds. As an example, if a user customizes a character in terms of look and accoutrements such that the character has a large amount of geometry and behaviors that are unique to the character, with prior art systems limited to the game client running in the home on a PC or game console, if that character were to come into view of another user, the user would have to wait until a long, slow download completes so that all of the geometry and behavior data loads into their computer. Within the hosting service 210, that same download could be over Gigabit Ethernet, served from a RAID array 1511-1512 at gigabit/second speed. Even if the home user had an 8 Mbps Internet connection (which is extremely fast by today's standards), Gigabit Ethernet is 100 times faster. So, what would take a minute over a fast Internet connection, would take less than a second over Gigabit Ethernet.

Combining Multiple Views of a Game or Application

One embodiment of the invention combines multiple views of a multi-player video game or application into a single video stream. For example, if four players are playing a video game, the views of each of the four players may be combined on the hosting service 210 and streamed to one or more of the four clients participating in the video game. As used herein, a "view" is generated from the perspective of a particular user in response to the execution of the video game. For example, Users A-D may be playing a video game as different characters with different perspectives in a common virtual environment created by the video game.

Figure 9:
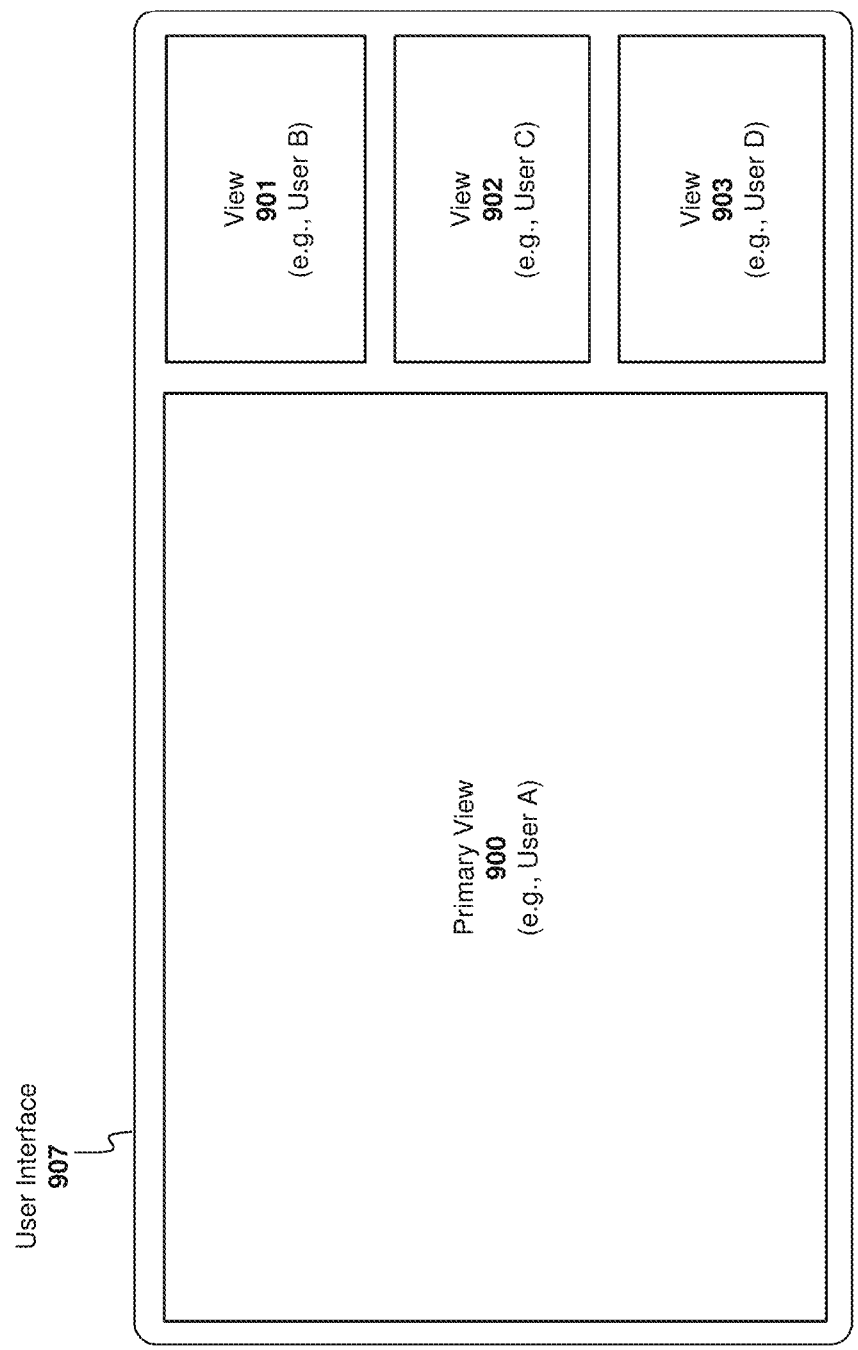
FIG. 9 illustrates one embodiment of a graphical user interface in which multiple views of a video game are composited into a single stream.

FIG. 9 illustrates an exemplary graphical user interface 907 comprising multiple views of a game generated by one embodiment of the invention including a primary view 900 and three secondary views 900-903. The terms "primary" and "secondary" refer to the perspective of a particular user. For example, the "primary" view for User A in FIG. 9 is generated from the perspective of a character controlled by User A. The secondary views 901-903 are generated from the perspectives of the other users participating in the multi-player game or application.

Figure 10:
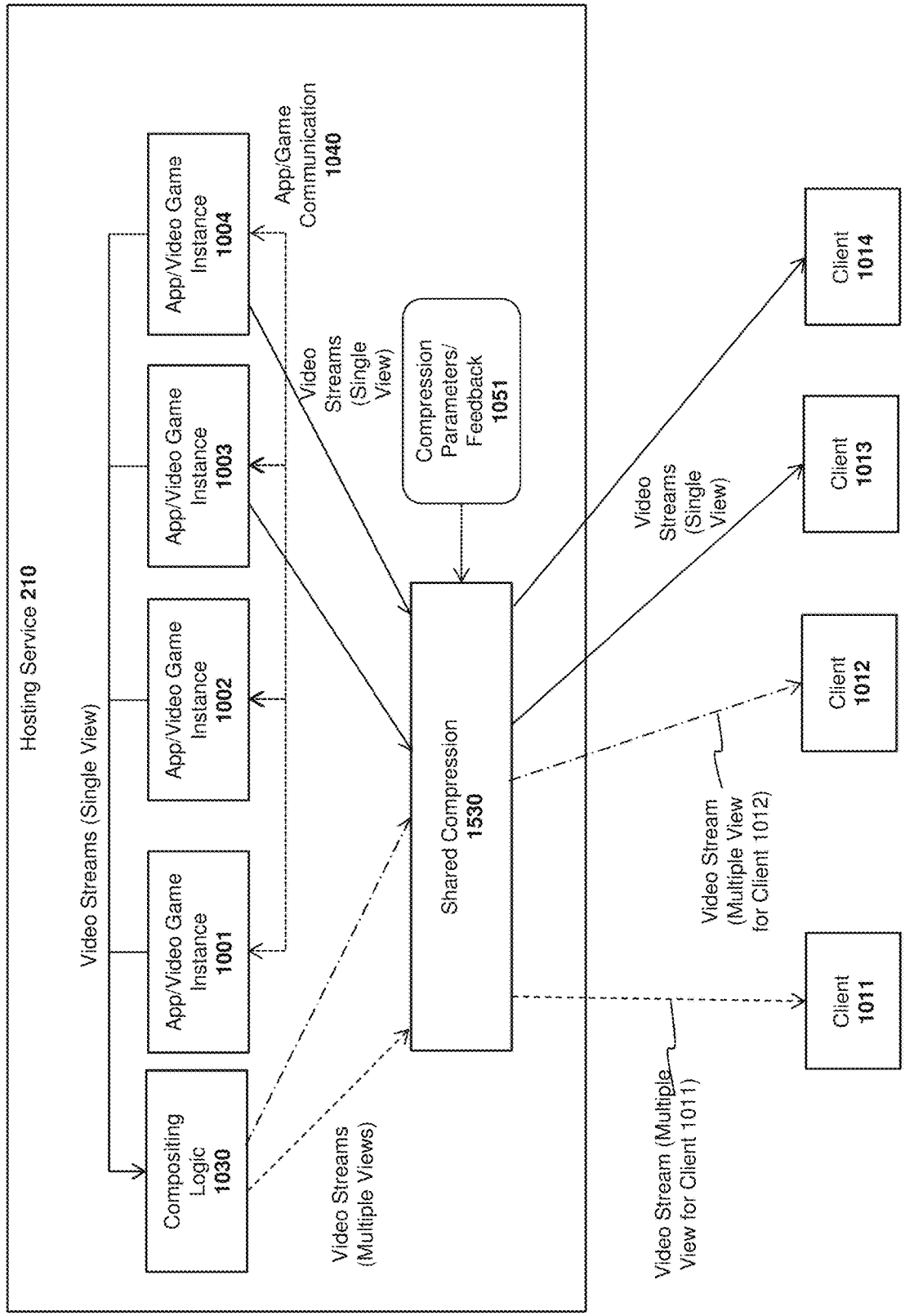
FIG. 10 illustrates a system for combining multiple views of a video game into a single stream.

One embodiment of the invention for combining multiple views of a multi-player video game or application into a single video stream is illustrated in FIG. 10. In the example shown in FIG. 10, application/video game instance 1001 is associated with client 1011 (e.g., executing the application video game in response to user control input as described in prior embodiments), application/video game instance 1002 is associated with client 1012, application/video game instance 1003 is associated with client 1013, and application/video game instance 1004 is associated with client 1014. As in prior embodiments of the invention, each application or video game is executed on the hosting service 210 as if the application/video game were executing locally on the client 1011-1014 with which it is associated (e.g., receiving control signals from the user as the user plays the video game and responsively executing the program code to render the video output).

In one embodiment, compositing logic 1030 combines video streams from each application/video game instance 1001-1004 into a multiple-view representation of the video game such as illustrated in FIG. 9. The compositing logic 1030 then transmits the resulting video stream to shared compression logic 1530 as previously described, which compresses and streams the video stream with low latency to each of the client devices 1011-1014.

In the specific example shown in FIG. 10, all three clients 1011-1014 are participating in the same multi-player video game, instances of which are represented by the application/video game instances. Application/game communication channels 1040 are established as indicated to allow each of the application/video game instances to track the activity of each of the game participants. For example, if a character being controlled by client 1011 on application/video game instance 1001 moves or fires a weapon, then this information is transmitted over application/game communication channels 1040 to the other application/video game instances 1002-1004 (i.e., so that they can update their video/audio output accordingly).

Each of the application/video game instances 1001-1004 generate a video output stream just as it would if it were executing locally on one of the clients 1011-1014. For example, in a first-person shooter, the video output would comprise a view from the perspective of the character being controlled from one of the respective clients 1011-1014.

In one embodiment, each of the video streams is provided to compositing logic 1030 which generates the multiple view representation of the video game (an example of which is shown in FIG. 9). In one embodiment, the compositing logic 1030 performs this function by overlaying each of the video streams at a designated location and with a specified view window size within the graphical user interface for each user. For example, referring back to FIG. 9, when generating a multiple-view representation for client 1011, the primary view 900 is generated from the perspective of the user controlling client 1011 and the secondary views 901-903 are generated from the perspective of the other clients 1012-1014.

In the specific example shown in FIG. 10, separate multi-view representations are generated for clients 1011 and 1012 (e.g., in response to the users of these clients indicating via a user input device that a multiple-view representation is desired) while clients 1013 and 1014 are playing the video game or using the application with a single view.

One of the benefits of creating the multiple-view representations on the hosting service 210 is that the views for each of the clients do not need to be uploaded and then downloaded to each individual client as would be the case if the video games were executing locally on the clients, thereby preserving bandwidth and maintaining a consistent multi-view representation. That is, the compositing logic 1030 is able to generate a consistent multiple-view representation in real time because it is provided access to each of the video streams directly as they are generated at the hosting service 210.

In one embodiment, the multiple-view and single view streams are uniquely generated for each client. For example, different clients may have different video processing capabilities (e.g., different resolutions, view decoding capabilities, etc). Consequently, each stream is generated based on the unique capabilities for the client for which it is generated.

The resulting multiple-view and single view video streams are then sent to shared compression logic for low-latency compression 1530. For example, as previously described, the shared compression 1530 operates with a latency such that the users playing the video game or using the application have the perception that the video game or application is responding instantly to control signals sent from each client 1011-1014. The shared compression 1530 compresses the video streams in response to a specified set of compression parameters and/or channel feedback 1051 received as previously described. For example, if a communication channel to a particular client is unable to support a particular resolution (e.g., because of low bandwidth or dropped packets) then the compression 1530 may responsively adjust the resolution and/or frame rate to reduce data transmission while maintaining an acceptable latency. Each individual client 1011-1014 receives and decompresses its own video stream containing either a single view or multiple-view representation.

While the embodiments of the invention described above execute a different game instance for each user (i.e., a different game instance 1001-1004 is executed for each client 1011-1014), one embodiment of the invention executes a single game instance for multiple clients/users. For example, the hosting service 210 may execute one game instance for a multi-player game being played by all of the clients 1011-1014. In this embodiment, the single game instance will receive control signals from the client, execute the game and generate streams for two or more remote users.

Figure 11:
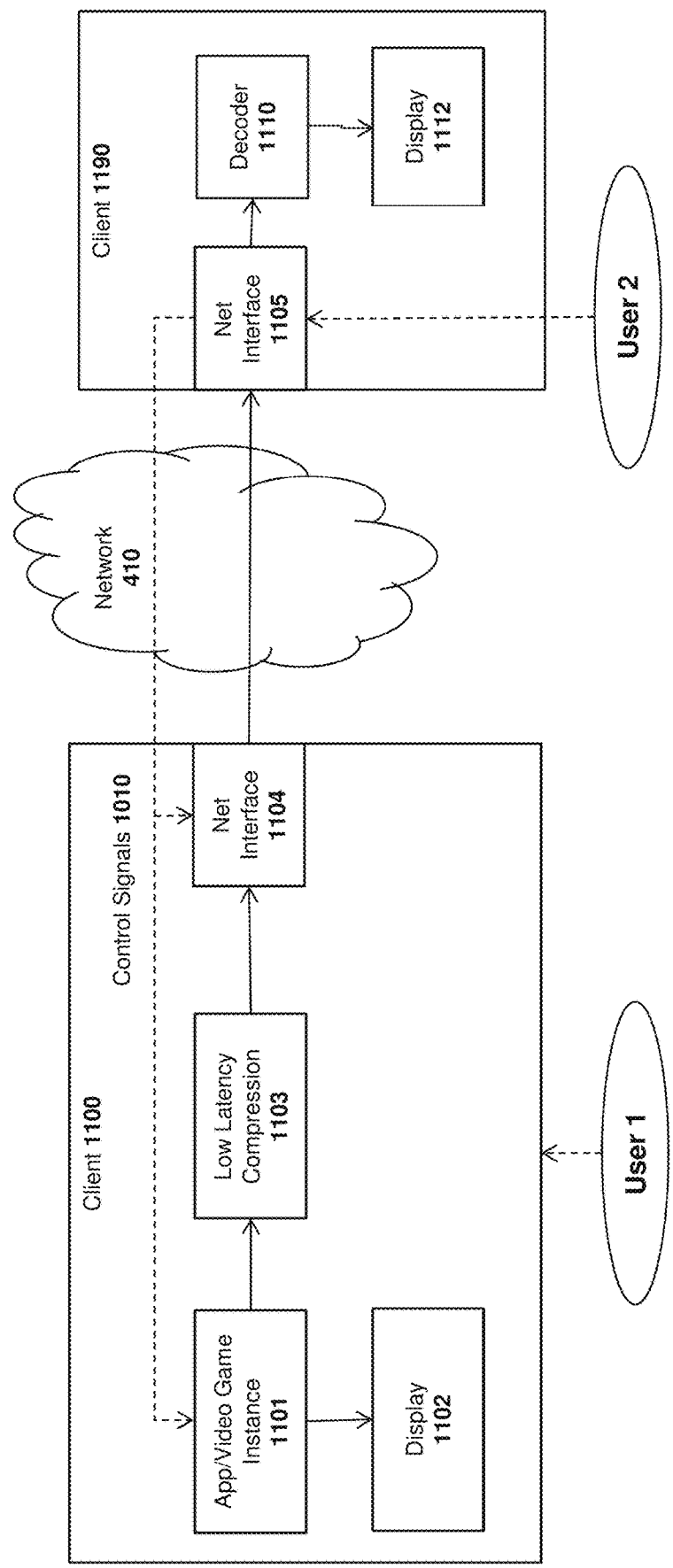
FIG. 11 illustrates one embodiment of the invention in which a single game instance is shared by multiple clients.

FIG. 11 illustrates one particular embodiment in which a single game or application instance 1101 is executed on client 1100 for two different users, identified as Users 1 and 2. As illustrated, control signals 1010 generated by User 2's input device (e.g., game controller) are received by a communication interface of client 1190 and transmitted from client 1190's network interface 1105 over a network 410 to network interface 1104 of client 1100. The control signals are then interpreted by application/video game instance 1101 which, in combination with control signals input by User 1 of client 1100, executes the video game or application and generates video output. The video output comprises a series of video frames which are displayed locally on the display 1102 of client 1100 and which are also compressed with low latency compression 1103 and transmitted via the network interface 1104 of client 1100, over network 410 to the network interface 1105 of client 1190. The compressed video frames are then decoded on client 1190 by decoder 1110 and rendered on the display 1112 for User 2.

In this manner, a single instance of a video game 1101 is shared by two different users connected over a network 410. The application/video game instance 1101 is executed locally for User 1 resulting in a local display of the video output on display 1102 and is compressed and streamed to User 2 (using low latency compression in one embodiment). The network 410 may be a local area network (e.g., a home WiFi network) or may be a larger network such as the Internet.

While illustrated in FIG. 11 as having only a single remote client 1190 coupled to client 1100 over a network 410, multiple remote clients (not shown) may be coupled to client 1100 over the network 410 to participate in the single application/video game instance 1101.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, and input devices have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A system for video gaming, comprising:
  a plurality of servers configured for instantiating a plurality of application/video game instances for a particular multi-player video game or application, the plurality of application/video game instances being executed in response to control signals received from a plurality of remote clients during a multi-player gaming session, each of the plurality of application/video game instances generating a corresponding video stream in association with a corresponding remote client of the plurality of remote clients;
  at least one server including compositing logic configured to receive video streams that are generated and uncompressed from the plurality of application/video game instances and combine the video streams that are generated and uncompressed from the plurality of application/video game instances into a composited video stream for a first remote client of the plurality of remote clients, the composited video stream being a multiple-view representation including each video stream that is combined, the first remote client being provided with an option to view a selected video stream of a corresponding application/video game instance being played or watched or to view the composited video stream;
  the at least one server configured for determining one or more compression parameters defining processing capabilities of the first remote client; and
  a compression resource including compression logic to compress the composited video stream or the selected video stream for the first remote client based on the one or more compression parameters,
  wherein the compression resource is configured to compress the composited video stream for delivery to each of the plurality of remote clients.

2. The system as in claim 1 wherein the compositing logic generates a separate composited video stream for each remote client, each corresponding separate composited video stream having a primary view generated from a perspective of a user of the corresponding remote client and a plurality of secondary views generated from perspectives of other users participating in the particular multi-player video game or application.

3. The system as in claim 2 wherein the first remote client receives the selected video stream and a second remote client receives a first corresponding separate composited video stream.

4. The system as in claim 1 wherein the compression logic compresses the composited video stream in response to feedback received indicating a current state of a communication channel.

5. The system as in claim 2 wherein the video streams combined by the compositing logic are generated by each of the plurality of application/video game instances for perspective views of a plurality of users participating in the particular multi-player video game or application.

6. The system as in claim 2 wherein the plurality of remote clients have different processing capabilities.

7. The system as in claim 6 wherein at least one of the plurality of remote clients is a touch-screen tablet.

8. The system as in claim 6 wherein at least one of the plurality of remote clients is a smartphone.

9. A method executed by a hosting service with a plurality of servers for video gaming, comprising:
  executing, by at least one server of the hosting service, a plurality of application/video game instances for a particular multi-player video game or application on the hosting service, the plurality of application/video game instances being executed in response to control signals received from a plurality of remote clients during a multi-player gaming session, each of the plurality of application/video game instances generating a corresponding video stream in association with a corresponding remote client of the plurality of remote clients;
  receiving video streams that are generated and uncompressed from the plurality of application/video game instances by the at least one server including compositing logic of the hosting service;
  combining, by the at least one server of the hosting service, the video streams that are uncompressed generated by the plurality of application/video game instances into a composited video stream for a first remote client of the plurality of remote clients, the composited video stream being a multiple-view representation including each video stream that is combined, the first remote client being provided with an option to view a selected video stream of a corresponding application/video game instance being played or watched or to view the composited video stream;

determining one or more compression parameters defining processing capabilities of the first remote client; and compressing, by a compression resource of the hosting service, the composited video stream or the selected video stream for the first remote client based on the one or more compression parameters, wherein the compression resource is configured to compress the composited video stream for delivery to each of the plurality of remote clients.

10. The method as in claim 9 further comprising generating a separate composited video stream for each of the plurality of remote clients, each corresponding separate composited video stream having a primary view generated from a perspective of a user of the corresponding remote client and a plurality of secondary views generated from perspectives of other users participating in the particular multi-player video game or application.

11. The method as in claim 10 wherein the first remote client receives the selected video stream and a second remote client receives a first corresponding separate composited video stream.

12. The method as in claim 9 wherein the compression resource compresses the composited video stream in response to feedback received indicating a current state of a communication channel.

13. The method as in claim 10 wherein the video streams combined by the compositing logic are generated by each of the plurality of application/video game instances for perspective views of a plurality of users participating in the particular multi-player video game or application.

14. The method as in claim 10 wherein the plurality of remote clients have different processing capabilities.

15. The method as in claim 14 wherein at least one of the plurality of remote clients is a touch-screen tablet.

16. The method as in claim 14 wherein at least one of the plurality of remote clients is a smartphone.

17. A system including a gaming service for video gaming, comprising:
a plurality of servers configured for instantiating a plurality of video game instances for a multi-player video game on the gaming service, the plurality of video game instances being executed in response to control signals received from a plurality of remote clients during a multi-player gaming session, each of the plurality of video game instances generating a corresponding video stream in association with a corresponding remote client, the corresponding remote client receiving the corresponding video stream to be presented on a screen associated with the corresponding remote client of the plurality of remote clients;

at least one server including compositing logic executed at the gaming service to receive video streams that are generated and uncompressed from the plurality of video game instances and combine the video streams that are uncompressed and generated by the plurality of video game instances into a composited video stream for a first remote client of the plurality of remote clients, the composited video stream being a multiple-view representation including each video stream that is combined, the first remote client being provided with an option to view a selected video stream for a selected video game instance or to view the composited video stream;

the at least one server configured for determining one or more compression parameters defining processing capabilities of the first remote client; and a compression resource including compression logic to compress the composited video stream or the selected video stream for the first remote client based on the one or more compression parameters, wherein the compression resource is configured to compress the composited video stream for delivery to each of the plurality of remote clients.

18. The system of claim 17, wherein the compression logic compresses the composited video stream in response to feedback received indicating a current state of a communication channel between the gaming service and the first remote client.

19. The system of claim 17, wherein the composited video stream combining the video streams that are uncompressed and generated by the plurality of video game instances for the multi-player video game includes a primary view generated from a perspective of a first user of the first remote client and a plurality of secondary views generated from perspectives of other users participating in the multi-player gaming session.

* * * * *